(12) United States Patent
Moon et al.

(10) Patent No.: US 11,284,150 B2
(45) Date of Patent: Mar. 22, 2022

(54) ELECTRONIC DEVICE FOR REPRODUCING DATA AND OPERATION METHOD THEREOF

(71) Applicant: Samsung Electronics Co., Ltd., Suwon-si (KR)

(72) Inventors: Jung Won Moon, Suwon-si (KR); Uk Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/961,651

(22) PCT Filed: Nov. 8, 2018

(86) PCT No.: PCT/KR2018/013500
§ 371 (c)(1),
(2) Date: Jul. 10, 2020

(87) PCT Pub. No.: WO2019/139236
PCT Pub. Date: Jul. 18, 2019

(65) Prior Publication Data
US 2021/0084364 A1 Mar. 18, 2021

(30) Foreign Application Priority Data
Jan. 11, 2018 (KR) .................. 10-2018-0003713

(51) Int. Cl.
*H04N 21/435* (2011.01)
*H04N 21/431* (2011.01)
(Continued)

(52) U.S. Cl.
CPC ....... *H04N 21/4353* (2013.01); *H04N 21/431* (2013.01); *H04N 21/439* (2013.01); *H04N 21/4383* (2013.01); *H04N 21/4405* (2013.01)

(58) Field of Classification Search
CPC .......... H04N 21/4353; H04N 21/4405; H04N 21/431; H04N 21/439; H04N 21/4383
See application file for complete search history.

(56) References Cited

U.S. PATENT DOCUMENTS 7,320,069 B1   1/2008  Sundharraj et al.
9,003,558 B1*  4/2015  Dorwin .................. G06F 21/10
                                                          726/30
(Continued)

FOREIGN PATENT DOCUMENTS

KR   10-2009-0126333 A   12/2009
KR   10-2012-0037213 A    4/2012
KR   10-2014-0129178 A   11/2014

OTHER PUBLICATIONS

International Search Report dated Feb. 22, 2019 in connection with International Patent Application No. PCT/KR2018/013500, 2 pages.
(Continued)

*Primary Examiner* — Yassin Alata

(57) ABSTRACT

An electronic device and an operation method thereof, according to various embodiments, may: receive first data and second data compressed in a designated compression scheme; decompress the received first data and the received second data on the basis of at least the designated compression scheme; decrypt the decompressed second data; detect success of the decryption; and reproduce the decompressed first data and the decrypted second data.

15 Claims, 17 Drawing Sheets

(51) Int. Cl.
  *H04N 21/438* (2011.01)
  *H04N 21/439* (2011.01)
  *H04N 21/4405* (2011.01)

(56) References Cited

U.S. PATENT DOCUMENTS 9,202,024 B2    12/2015    Hierro et al.
2013/0246803 A1    9/2013    Vale et al.

OTHER PUBLICATIONS

Written Opinion of the International Searching Authority dated Feb. 22, 2019 in connection with International Patent Application No. PCT/KR2018/013500, 5 pages.
Moon et al., "A Study on DRM Application on High-quality Audio", 2018 IEEE International Conference on Consumer Electronics, Jan. 12-14, 2018, 3 pages.
Korean Intellectual Property Office, "Notice of Preliminary Rejection" dated Feb. 3, 2022, in connection with Korean Patent Application No. 10-2018-0003713, 9 pages.

* cited by examiner

ELECTRONIC DEVICE FOR REPRODUCING DATA AND OPERATION METHOD THEREOF

CROSS-REFERENCE TO RELATED APPLICATIONS

This application is a 371 of International Application No. PCT/KR2018/013500 filed on Nov. 8, 2018, which claims priority to Korean Patent Application No. 10-2018-0003713 filed on Jan. 11, 2018, the disclosures of which are herein incorporated by reference in their entirety.

1. FIELD

The disclosure relates to an electronic device for reproducing data and a method of operating the same.

2. DESCRIPTION OF RELATED ART

Digital Rights Management (DRM) is a technology for protecting and managing rights of a writer of multimedia content. To this end, a server may compress and encrypt multimedia content and provide the multimedia content to an electronic device according to a request from a user through the electronic device. The electronic device may decrypt and decompress the multimedia content. The electronic device may reproduce the multimedia content, and the user of the electronic device may view the multimedia content. According to current demands of users who desire to view high-quality multimedia content, the server uses a lossless compression scheme to compress multimedia content. At this time, the lossless compression scheme has low compression efficiency, and thus capacity of multimedia content compressed by the server may be large.

However, the electronic device should decrypt all of the multimedia content and then decompress the multimedia content, and thus overhead may be generated during the operation of the electronic device. This is because the server performs encryption after compressing all of the multimedia content. Accordingly, the performance of the electronic device may deteriorate. Such a problem may become more serious as the server introduces a lossless compression scheme. Further, when the electronic device fails in decrypting the multimedia content, a user of the electronic device cannot view the multimedia content at all.

SUMMARY

In accordance with an aspect of the disclosure, an electronic device is provided. The electronic device includes: a communication module, an audio module, at least one processor operatively connected to the communication module and the audio module, and a memory operatively connected to the processor.

The memory may store instructions causing the processor to, when executed, receive first data and second data, compressed in a predetermined compression scheme, from an external electronic device through the communication module, decompress the first data and the second data partially on the basis of the predetermined compression scheme, decrypt the decompressed second data, and reproduce the decompressed first data and the decrypted second data through the audio module.

In accordance with another aspect of the disclosure, a method of operating an electronic device is provided. The method includes receiving first data and second data, compressed in a predetermined compression scheme, decompressing the received first data and the received second data partially on the basis of the predetermined compression scheme, decrypting the decompressed second data, detecting success of the decryption, and reproducing the decompressed first data and the decrypted second data.

In accordance with another aspect of the disclosure, a non-transitory computer-readable storage medium is provided. The non-transitory computer-readable storage medium may store one or more programs for performing the operations of: receiving first data and second data, compressed in a predetermined compression scheme, decompressing the received first data and the received second data partially on the basis of the predetermined compression scheme, decrypting the decompressed second data, detecting success of the decryption, and reproducing the decompressed first data and the decrypted second data.

An electronic device according to various embodiments can decrypt data having a predetermined size in multimedia content, and thus reduce overhead during the operation of the electronic device. Accordingly, when decryption is successful, the electronic device can reproduce high-quality multimedia content. Meanwhile, even though the decryption fails, the electronic device can reproduce the remaining data in the multimedia content. That is, the electronic device can reproduce the multimedia content even with a low quality. Accordingly, it is possible to reproduce multimedia content with various qualities.

DETAILED DESCRIPTION

Hereinafter, various embodiments of the disclosure will be described with the accompanied drawings.

Figure 1:
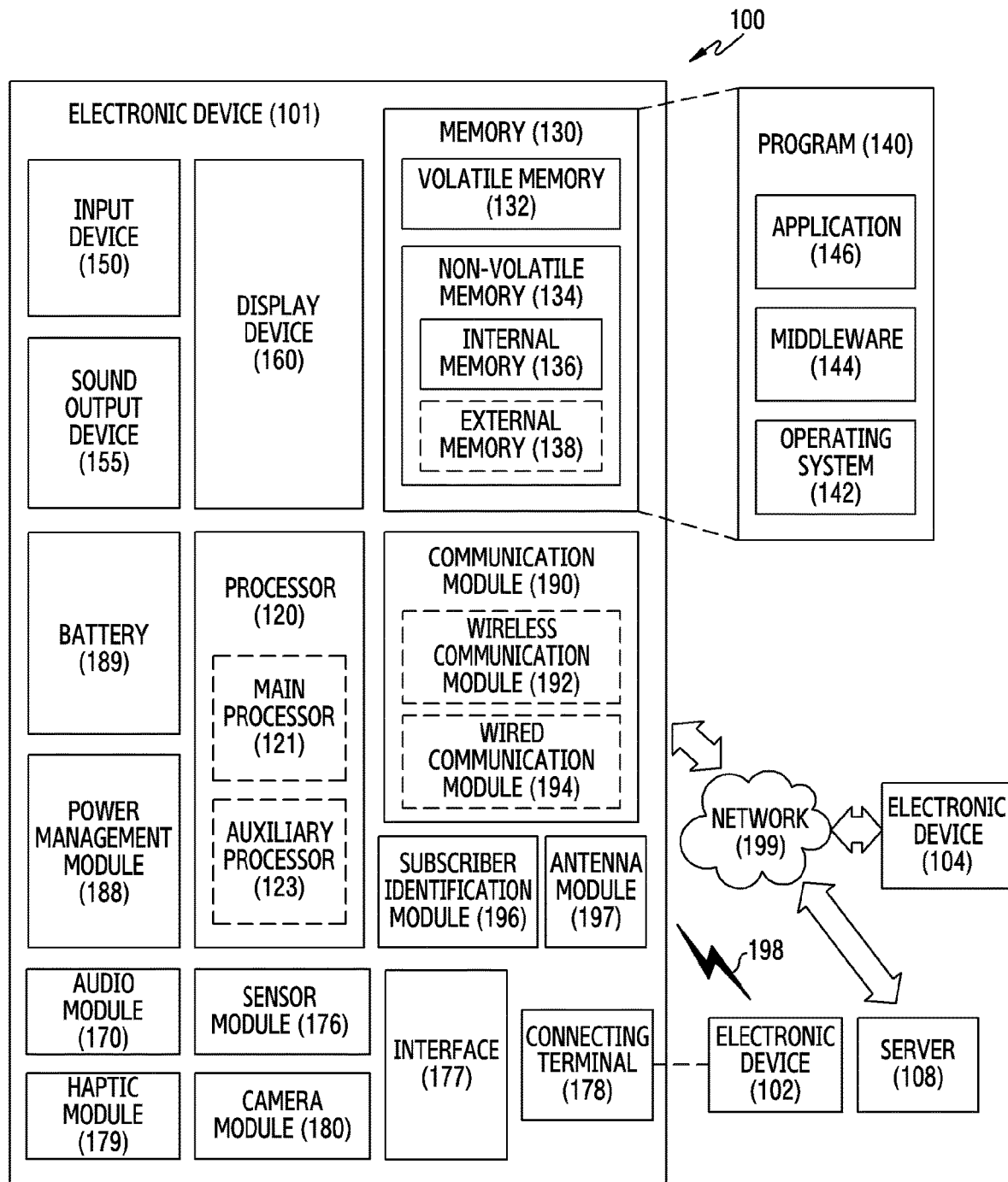
FIG. 1 illustrates a block diagram of an electronic device within a network environment according to an embodiment of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to various embodiments, an external electronic device (for example, an electronic device 102, an electronic device 104, or a server 108) may transmit first data and second data. The external electronic device may determine the second data to have a predetermined size in multimedia content and encrypt the second data. The external electronic device may encrypt the second data on the basis of a DRM scheme. After encrypting the second data, the external electronic device may compress and transmit the first data and the second data. The external electronic device may compress the first data and the second data in a predetermined compression scheme. The external electronic device may combine and compress the first data and the second data or separately compress the first data and the second data. According to an embodiment, the external electronic device may or may not transmit the second data according to a user. For example, the external electronic device may transmit both the first data and the second data to an authenticated user, and may transmit the first data to a non-authenticated user without the second data. According to another embodiment, the external electronic device may transmit some of the first data and the second data and then additionally transmit the remaining data of one of the first data or the second data on the basis of a user's determination.

According to various embodiments, the electronic device (for example, the electronic device 101) may receive at least one piece of the first data and the second data. The first data and the second data may be compressed in a predetermined compression scheme. Accordingly, the electronic device may decompress the first data and the second data without any compression loss. After decompressing the first data and the second data, the electronic device may decrypt the second data. When decryption of the second data is successful, the electronic device may combine and reproduce the first data and the second data. When decryption of the second data fails, the electronic device may replace the second data with third data and combine and reproduce the first data and the third data. The size of the third data may be the same as the size of the second data. According to an embodiment, the electronic device may generate values of bits in the third data as 0. Accordingly, the electronic device may reproduce the third data as blank. According to another embodiment, the electronic device may generate values of bits in the third data as a predetermined value. Accordingly, the electronic device may reproduce the third data as noise.

According to an embodiment, the electronic device may receive the first data without the second data. The first data may be compressed in a predetermined compression scheme. Accordingly, the electronic device may decompress the first data without any compression loss. After decompressing the first data, the electronic device may replace the second data with the third data and combine and reproduce the first data and the third data. The size of the third data may be the same as the size of the second data. According to an embodiment, the electronic device may generate values of bits in the third data as 0. Accordingly, the electronic device may reproduce the third data as blank. According to another embodiment, the electronic device may generate values of bits in the third data as a predetermined value. Accordingly, the electronic device may reproduce the third data as noise.

According to various embodiments, the electronic device may reproduce multimedia content with various qualities. The electronic device may reproduce the first data and the second data together. Accordingly, the user of the electronic device may use high-quality multimedia content. For example, the user of the electronic device may use an audio signal with a high sound quality or an image signal with a high definition quality. The electronic device may reproduce the first data and the third data together. Accordingly, the user of the electronic device may use low-quality multimedia content. For example, the user of the electronic device may use an audio signal with a low sound quality or an image signal with a low definition quality. According to an embodiment, the electronic device may generate values of bits in the third data as 0 and reproduce the third data as blank. According to another embodiment, the electronic device may generate values of bits in the third data as a predetermined value and reproduce the third data as noise. As the third data is reproduced as noise, the user of the electronic device may use low-quality multimedia content.

An electronic device (for example, the electronic device 101) according to various embodiments may include a communication module (for example, the communication module 190), an audio module (for example, the audio module 170), at least one processor (for example, the processor 120) operatively connected to the communication module and the audio module, and a memory (for example, the memory 130) operatively connected to the processor.

According to various embodiments, the memory may store instructions causing the processor to, when executed, receive first data and second data, compressed in a predetermined compression scheme, from an external electronic device through the communication module, decompress the first data and the second data partially on the basis of the predetermined compression scheme, decrypt the decompressed second data, and reproduce the decompressed first data and the decrypted second data through the audio module.

According to various embodiments, the instructions may cause the processor to, when failure of decryption is detected, replace the decompressed second data with third data and reproduce the decompressed first data and the third data through the audio module.

According to various embodiments, a number of bits in the third data may be the same as a number of bits in the decrypted second data, and values of the bits in the third data may be 0.

According to various embodiments, the instructions cause the processor to decompress the first data received through the communication module and reproduce the decompressed first data and fourth data through the audio module.

According to various embodiments, the first data and the second data may be transmitted according to a plurality of frames including a first region for the first data and a second region for the second data.

According to various embodiments, the instructions cause the processor to receive some of the first data and some of the second data in at least one of the frames.

According to various embodiments, the instructions cause the processor to receive the remaining data of the first data in the remaining frames of the frames, decompress the received remaining data of the first data, and reproduce the decompressed remaining data of the first data and fifth data through the audio module.

According to various embodiments, the instructions cause the processor to decompress a part of the first data and a part of the second data, decrypt the decompressed part of the second data, and reproduce the decompressed part of the first data and decrypted part of the second data through the audio module.

According to various embodiments, the electronic device may further include a display device (for example, the display device 160) operatively connected to the processor.

According to various embodiments, the instructions cause the processor to display a graphic user interface to determine whether to receive the remaining data of the first data and the remaining data of the second data.

According to various embodiments, the instructions cause the processor to make a request for the first data and the second data to an external electronic device through the communication module on the basis of information indicating the second data can be decrypted.

According to various embodiments, the second data may be data encrypted partially on the basis of a predetermined encryption scheme.

According to various embodiments, the instructions cause the processor to decrypt the decompressed second data partially on the basis of the predetermined encryption scheme.

Figure 2:
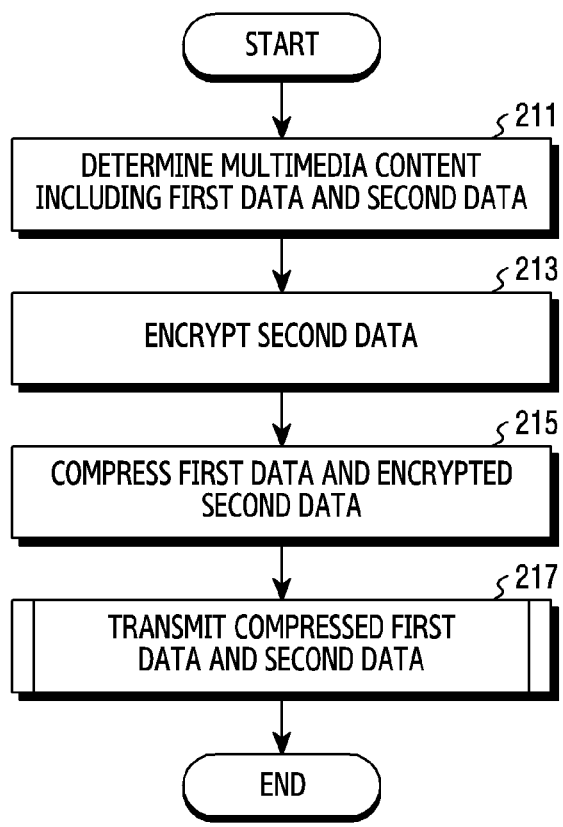
FIG. 2 illustrates a flowchart for a method of operating an external electronic device according an embodiment of the disclosure.

FIG. 2 is a flowchart illustrating a method of operating an external electronic device (for example, the electronic device 102, the electronic device 104, or the server 108) according to various embodiments. FIGS. 3, 4, 5, and 6 illustrate examples of the structure of data processed by the external electronic device according to various embodiments.

Figure 3A:
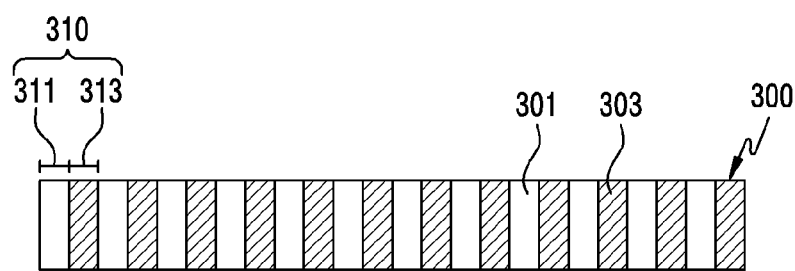
FIG. 3 illustrates examples of the structure of data processed by an external device according to an embodiment of the disclosure.

Referring to FIG. 2, the external electronic device may determine multimedia content 300 in operation 211. The multimedia content 300 may include first data 301 and second data 303. The multimedia content 300 may include at least one piece of image data, audio data, or text data. The multimedia content 300 may be divided into a plurality of frames 310 as illustrated in FIG. 3A. The multimedia content 300 may be raw data in, for example, a Pulse Code Modulation (PCM) format. In the multimedia content 300, the frames 310 may be divided in units of a predetermined number of bits, for example, 16 or 24 bits. Each of the frames 310 consists of, for example, 16 or 24 bits, and may include a first region 311 for first data 301 and a second region 313 for second data 303. In each of the frames 310, the second region 313 may include a predetermined number of bits, for example, 8 bits, and the first region 311 may include the remaining bits, for example, 8 or 16 bits except for the second region 313 in each of the frames 310. That is, in each of the frames 310, the size of the second region 313 may be consistent regardless of the size of the first region 311. For example, in each of the frames 310, the second region 313 may be located at the end of the first region 311. In another example, in each of the frames 310, the second region 313 may be located at the first of the first region 311.

Figure 3B:
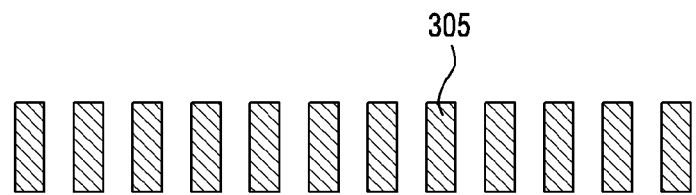

The external electronic device may encrypt the second data 303 in operation 213. To this end, the external electronic device may detect the second data 303 in the second region 313 of the frames 310. The external electronic device may encrypt the second data 303 in a predetermined encryption scheme. The external electronic device may encrypt the second data 303 on the basis of, for example, a DRM scheme. The external electronic device may encrypt the second data 303 corresponding to the second region 313 without encrypting the first data 301 corresponding to the first region 311 in the frames 310. Accordingly, the external electronic device may generate encrypted second data 305 as illustrated in FIG. 3B. That is, in each of the frames 310, since the size of the second region 313 is consistently maintained regardless of the size of the first region 311, the size of the second data 305 encrypted by the external electronic device may be consistent regardless of the size of the multimedia content 300.

The external electronic device may compress the first data 301 and the encrypted second data 305 in operation 215. The external electronic device may compress the first data 301 and the encrypted second data 305 through a predetermined compression scheme. The external electronic device may convert the first data 301 and the encrypted second data 305 to, for example, a Free Lossless Audio Codec (FLAC) format.

Figure 4A:
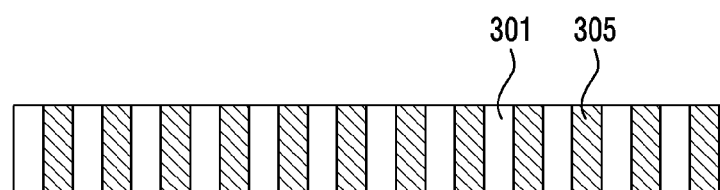
FIG. 4 illustrates examples of the structure of data processed by an external device according to an embodiment of the disclosure.
Figure 4B:
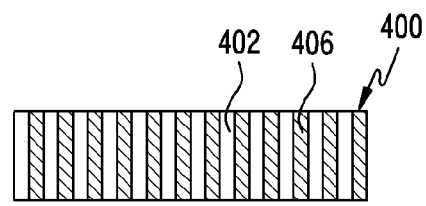

According to an embodiment, the external electronic device may combine and compress the first data 301 and the encrypted second data 305. The external electronic device may combine and compress the first data 301 and the encrypted second data 305 as illustrated in FIG. 4A. Accordingly, the external electronic device may generate compressed content 400 as illustrated in FIG. 4B. In the compressed content 400, compressed first data 402 and compressed second data 406 may be combined.

Figure 5A:
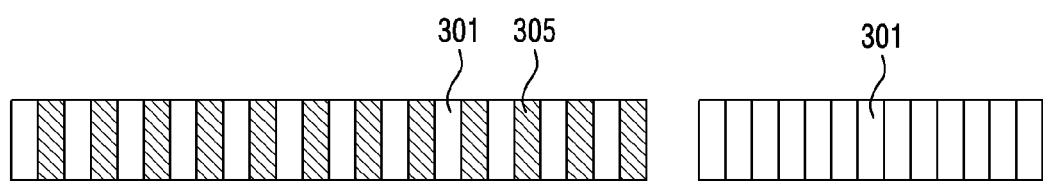
FIG. 5 illustrates examples of the structure of data processed by an external device according to an embodiment of the disclosure.
Figure 5B:
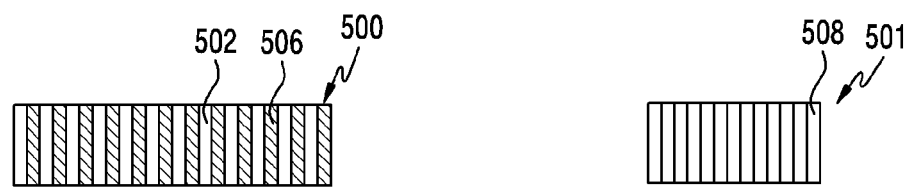

According to another embodiment, the external electronic device may not only combine and compress the first data 301 and the encrypted second data 305 but also separately compress the first data 301. The external electronic device may not only combine and compress the encrypted second data 305 in the second region 313 of the frames 310 but also detect and compress the first data 301 in the first region 311 of the frames 310 as illustrated in FIG. 5A. The external electronic device may generate first compressed content 500 and second compressed content 501 as illustrated in FIG. 5B. In the first compressed content 500, compressed first data 502 and compressed second data 506 may be combined. The external electronic device may use the compressed first data 508 to generate the second compressed content 501.

Figure 6A:
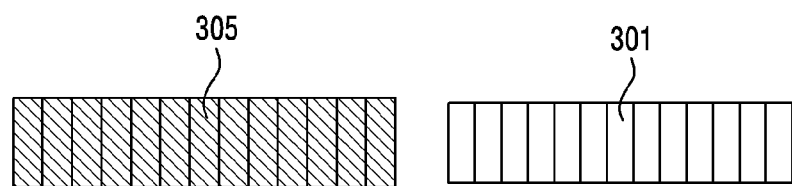
FIG. 6 illustrates examples of the structure of data processed by an external device according to an embodiment of the disclosure.
Figure 6B:
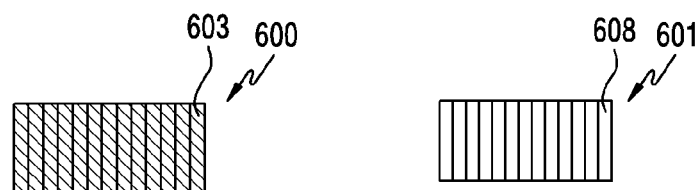

According to another embodiment, the external electronic device may separate and compress the first data 301 and the second data 303. The external electronic device may detect and compress the first data 301 in the first region 311 of the frames 301 and compress the encrypted second data 305 separately therefrom as illustrated in FIG. 6A. The external electronic device may generate first compressed content 600 and second compressed content 601 as illustrated in FIG. 6B. The external electronic device may use the compressed second data 603 to generate the first compressed content 600 and use the compressed first data 608 to generate the second compressed content 601.

The external electronic device may transmit the compressed first data 402, 508, and 608 and the compressed second data 406, 506, and 603 in operation 217. The external electronic device may transmit the compressed first data 402 and 502 and the compressed second data 406 and 506 in a combined state as illustrated in FIGS. 4 and 5. Alternatively, the external electronic device may transmit the compressed first data 608 and the compressed second data 603 in a separate state as illustrate din FIG. 6. For example, the external electronic device may transmit the compressed first data 402, 502, and 608 and the compressed second data 406, 506, and 603 in response to a transmission request from the electronic device (for example, the electronic device 101).

Figure 7:
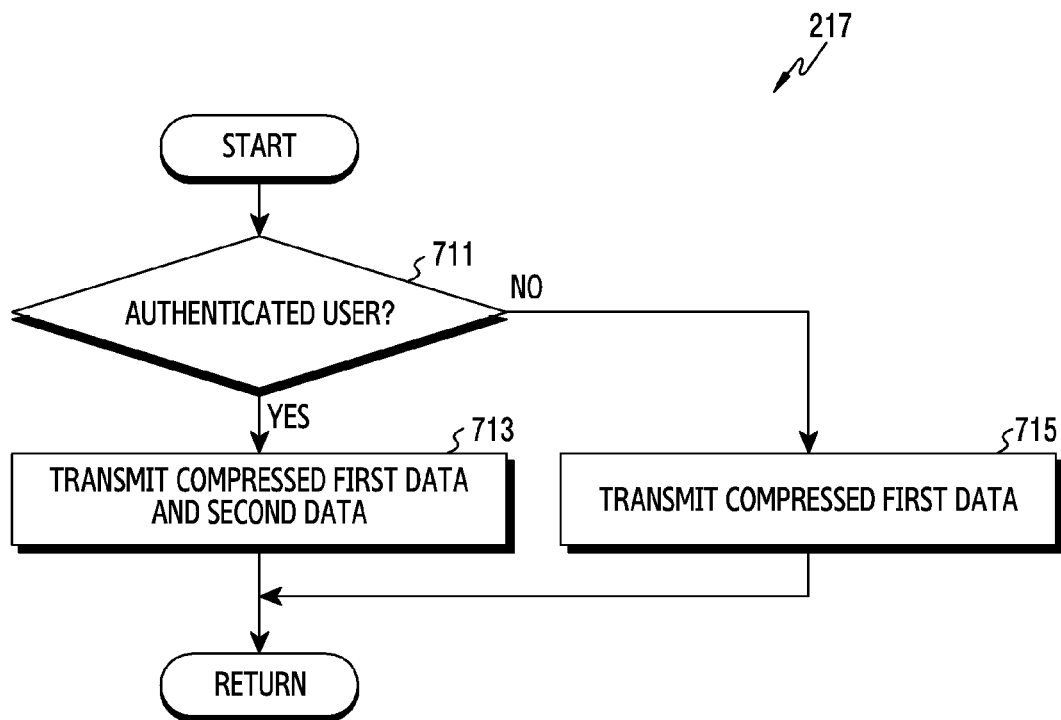
FIG. 7 illustrates a flowchart for the operation of transmitting compressed first data and second data in FIG. 2 according to an embodiment of the disclosure.

FIG. 7 is a flowchart illustrating the operation 217 of transmitting the compressed first data 502 and 608 and second data 506 and 603 in FIG. 2 according to an embodiment.

Referring to FIG. 7, the external electronic device may determine whether a request for the multimedia content 300 is made by the electronic device of the authenticated user in operation 711. The external electronic device may detect the request for the multimedia content 300 from the electronic device and determine whether to transmit the compressed first data 502 and 608 and the compressed second data 506 and 603 to the electronic device. When the electronic device belongs to the authenticated user, the external electronic device may determine to transmit the compressed first data 502 and 608 and the compressed second data 506 and 603. For example, when the electronic device can decrypt the second data 305 encrypted by the external electronic device, the electronic device may transmit information indicating that the second data 305 encrypted by the external electronic device can be decrypted on the basis a user authentication procedure.

When it is determined that the request for the multimedia content 300 is made by the authenticated user in operation 711, the external electronic device may transmit the compressed first data 502 and 608 and the compressed second data 506 and 603 to the electronic device in operation 713. The external electronic device may transmit the compressed first data 502 and the compressed second data 506 in a combined state as illustrated in FIG. 5. Alternatively, the external electronic device may transmit the compressed first data 502 and the compressed second data 506 in a separate state as illustrated in FIG. 6. Further, the external electronic device may return to FIG. 2.

When it is determined that the request for the multimedia content 300 is not made by the authenticated user in operation 711, the external electronic device may transmit the compressed first data 508 and 608 to the electronic device in operation 715. The external electronic device may transmit the compressed first data 508 and 608 as illustrated in FIG. 5 or 6. Further, the external electronic device may return to FIG. 2.

Figure 8:
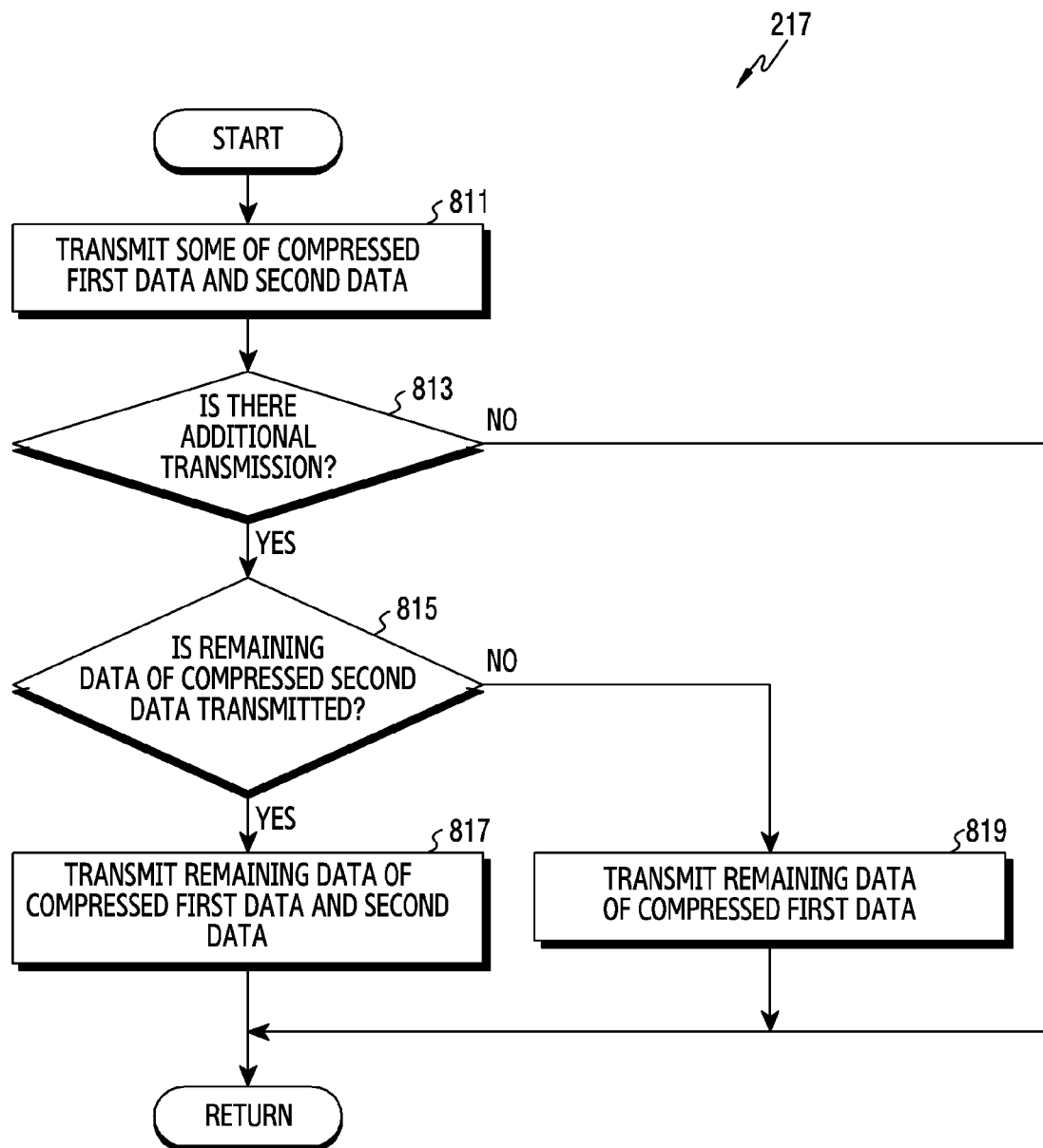
FIG. 8 illustrates a flowchart for the operation of transmitting compressed first data and second data in FIG. 2 according to another embodiment of the disclosure.

FIG. 8 is a flowchart illustrating the operation 217 of transmitting the compressed first data 502 and 608 and second data 506 and 603 in FIG. 2 according to another embodiment.

Referring to FIG. 8, the external electronic device may transmit some of the compressed first data 502 and 608 and the compressed second data 506 and 603 to the electronic device in operation 811. The external electronic device may transmit some of the compressed first data 502 and 608 and the compressed second data 506 and 603 in response to at least one of the frames 310. For example, the external electronic device may transmit some of the compressed first data 502 and 608 and the compressed second data 506 and 603 to the electronic device on the basis of a transmission request from the electronic device.

The external electronic device may additionally determine whether to transmit the remaining data of at least one of the compressed first data 502 and 608 or the compressed second data 506 and 603 in operation 813. For example, the external electronic device may determine whether there is a request for additionally transmitting the remaining data of at least one of the compressed first data 502 and 608 or the compressed second data 506 and 603 from the electronic device for a predetermined time interval after some of the first data 502 and 608 and the compressed second data 506 and 603 is transmitted.

When it is determined that there is no need to additionally transmit the remaining data of the compressed first data 502 and 608 and the compressed second data 506 and 603 in operation 813, the external electronic device may return to FIG. 2. For example, when a predetermined time interval passes without any additional transmission request from the electronic device after some of the compressed first data 502 and 608 and the compressed second data 506 and 603 is transmitted, the external electronic device may determine that there is no need to additionally transmit the remaining data of the compressed first data 502 and 608 and the compressed second data 506 and 603.

When it is determined that there is a need to additionally transmit the remaining data of at least one of the compressed first data 502 and 608 or the compressed second data 506 and 603 in operation 813, the external electronic device may determine whether to transmit the remaining data of the compressed second data 506 and 603 in operation 815. For example, when there is an additional transmission request from the electronic device after some of the compressed first data 502 and 608 and the compressed second data 506 and 603 is transmitted, the external electronic device may determine to additionally transmit the remaining data of at least one of the compressed first data 502 or 608 and the compressed second data 506 and 603. The external electronic device may determine whether to transmit the remaining data of the compressed second data 506 and 603 on the basis of the additional transmission request from the electronic device. That is, the external electronic device may determine whether there is a request for the remaining data of the compressed second data 506 and 603 from the electronic device.

When it is determined to transmit the compressed second data 506 and 603 in operation 815, the external electronic device may transmit the remaining data of the compressed first data 502 and 608 and the compressed second data 506 and 603 to the electronic device in operation 817. For example, when there is a request for the remaining data of the compressed second data 506 and 603 from the electronic device, the external electronic device may transmit the remaining data of the compressed first data 502 and 608 and the compressed second data 506 and 603 to the electronic device. The external electronic device may transmit the remaining data of the compressed first data 502 and 608 and the compressed second data 506 and 603 in accordance with the remaining frames of the frames 310. Further, the external electronic device may return to FIG. 2.

When it is determined that there is no need to transmit the compressed second data 506 and 603 in operation 815, the external electronic device may transmit the remaining data of the compressed first data 502 and 608 to the electronic device in operation 819. For example, when there is no request for the remaining data of the compressed second data 506 and 603 from the electronic device, the external electronic device may transmit the remaining data of the compressed first data 502 and 608 to the electronic device. The external electronic device may transmit the remaining data of the compressed first data 502 and 608 in accordance with the remaining frames of the frames 310. Further, the external electronic device may return to FIG. 2.

Figure 9:
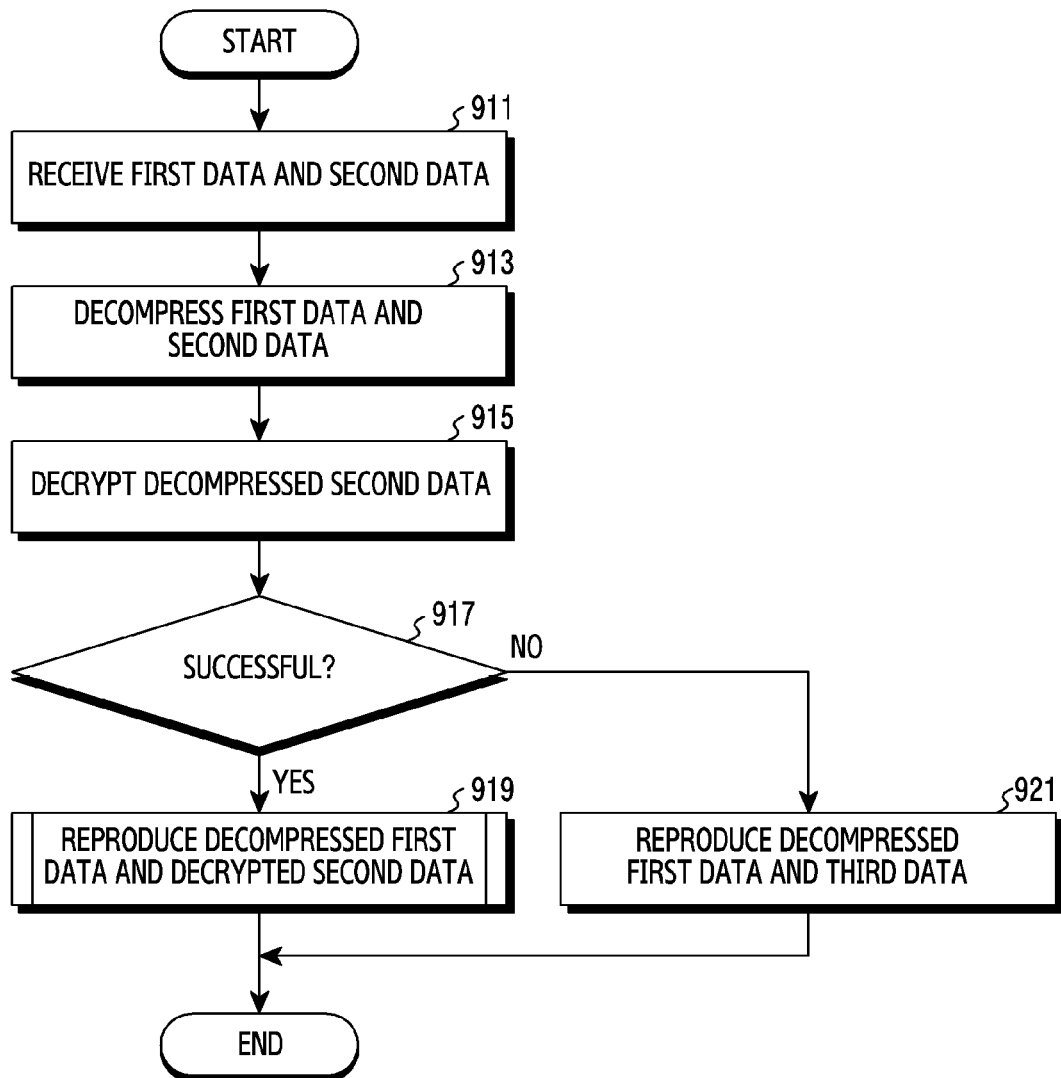
FIG. 9 illustrates a flowchart for a method of operating an electronic device according to an embodiment of the disclosure.

FIG. 9 is a flowchart illustrating a method of operating an electronic device (for example, the electronic device 101) according to various embodiments. FIGS. 10, 11, 12, and 13 illustrate examples of the structure of data processed by the electronic device according to various embodiments.

Referring to FIG. 9, the electronic device may receive first data 1001 and 1101 (for example, the compressed first data 402 of FIG. 4, the compressed first data 502 of FIG. 5, and the compressed first data 608 of FIG. 6) and second data 1003 and 1103 (for example, the compressed second data 406 of FIG. 4, the compressed second data 506 of FIG. 5, and the compressed second data 603 of FIG. 6) in operation 911. A processor (for example, the processor 120) of the electronic device may receive the first data 1001 and 1101 and the second data 1003 and 1103 through a communication module (for example, the communication module 190). The first data 1001 and 1101 and the second data 1003 and 1103 may be compressed in a predetermined compression scheme. The first data 1001 and 1101 and the second data 1003 and 1103 may be compressed in, for example, a FLAC format. The size of the second data 1003 and 1103 may be consistent regardless of the size of the first data 1001 and 1101. For example, the processor may store the first data 1001 and 1101 and the second data 1003 and 1103 in a memory (for example, the memory 130).

The electronic device may decompress the first data 1001 and 1101 and the second data 1003 and 1103 in operation 913. The processor of the electronic device may decompress the first data 1001 and 1101 and the second data 1003 and 1103. For example, the processor may detect the first data 1001 and 1101 and the second data 1003 and 1103 in the memory and decompress the first data 1001 and 1101 and the second data 1003 and 1103. In another example, when the first data 1001 and 1101 and the second data 1003 and 1103 are received in operation 911, the processor may decompress the first data 1001 and 1101 and the second data 1003 and 1103. The decompressed first data 1002 and 1102 and the decompressed second data 1004 and 1104 may be converted to, for example, a PCM format. The decompressed first data 1002 and 1102 may not be encrypted, and the decompressed second data 1004 and 1104 may be encrypted. The decompressed second data 1004 and 1104 may be encrypted on the basis of a DRM scheme.

Figure 10A:
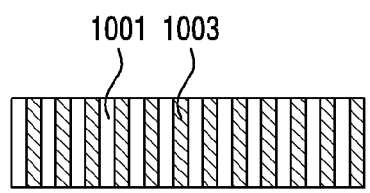
FIG. 10 illustrates examples of the structure of data processed by the electronic device according to an embodiment of the disclosure.
Figure 10B:
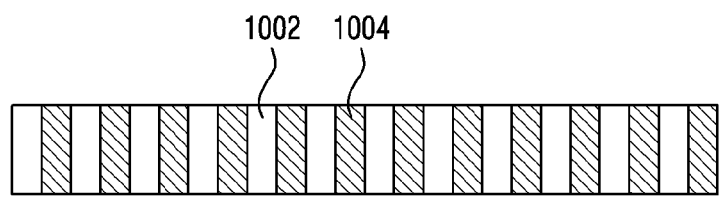

According to an embodiment, the first data 1001 and the second data 1003 may be compressed in a combined state as illustrated in FIG. 10A. The processor may decompress the first data 1001 and the second data 1003 to acquire the decompressed first data 1001 and the decompressed second data 1003 in a combined state as illustrated in FIG. 10B. Accordingly, the decompressed first data 1002 and the decompressed second data 1004 may be alternately arranged according to a predetermined number of bits.

Figure 11A:
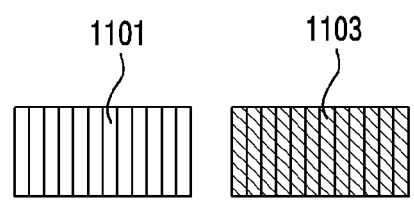
FIG. 11 illustrates examples of the structure of data processed by the electronic device according to an embodiment of the disclosure.
Figure 11B:
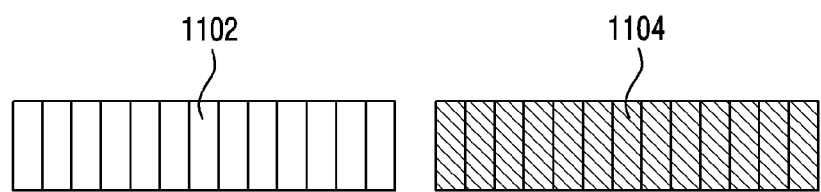

According to another embodiment, the first data 1101 and the second data 1103 may be compressed in a separate state as illustrated in FIG. 11A. The processor may decompress each of the first data 1101 and the second data 1103 to acquire the decompressed first data 1102 and the decompressed second data 1104 in a separate state as illustrate din FIG. 11B.

The electronic device may decrypt the decompressed second data 1104 and 1104 in operation 915. The processor of the electronic device may decrypt the decompressed second data 1004 and 1104 on the basis of a DRM scheme. The processor may decrypt the decompressed second data 1004 and 1104 without decrypting the decompressed first data 1002 and 1102. The electronic device may determine whether decryption of the decompressed second data 1004 and 1104 is successful in operation 917.

Figure 12A:
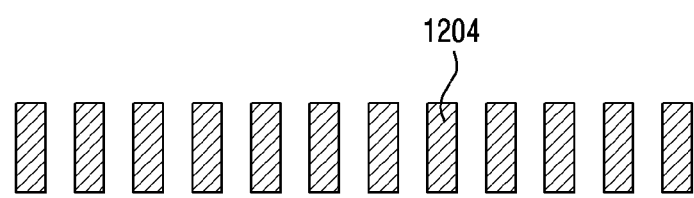
FIG. 12 illustrates examples of the structure of data processed by the electronic device according to an embodiment of the disclosure.
Figure 12B:
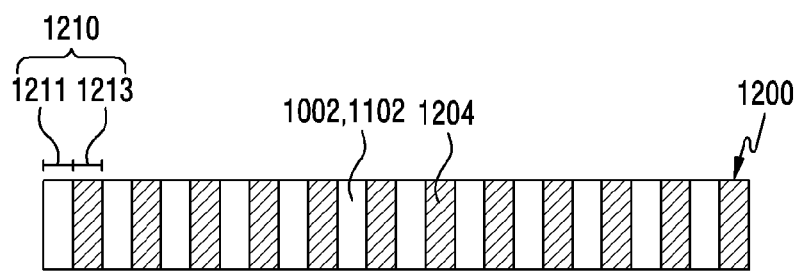

When it is determined that the decryption of the decompressed second data 1004 and 1104 is successful in operation 917, the electronic device may reproduce the decompressed first data 1002 and 1102 and the decrypted second data 1204 in operation 919. When the electronic device decrypts the decompressed second data 1004 and 1104 as illustrated in FIG. 12A, the processor may configure multimedia content 1200 by combining the decompressed first data 1002 and 1102 and the decrypted second data 1204 as illustrated in FIG. 12B. The multimedia content 1200 may include at least one piece of image data, audio data, or text data. Accordingly, the processor may reproduce the multimedia content 1200 through at least one of a display device (for example, the display device 160) or an audio module (for example, the audio module 170). The multimedia content 1200 may be divided into a plurality of frames 1210. In the multimedia content 1200, the frames 1210 may be divided in units of a predetermined number of bits, for example, 16 or 24 bits. Each of the frames 1210 may include a first region 1211 for the decompressed first data 1002 and 1102 and a second region 1213 for the decrypted second data 1204. In each of the frames 1210, the second region 1213 may consist of a predetermined number of bits, for example, 8 bits.

Figure 13A:
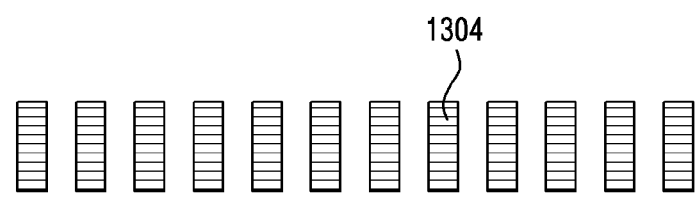
FIG. 13 illustrates examples of the structure of data processed by the electronic device according to an embodiment of the disclosure.
Figure 13B:
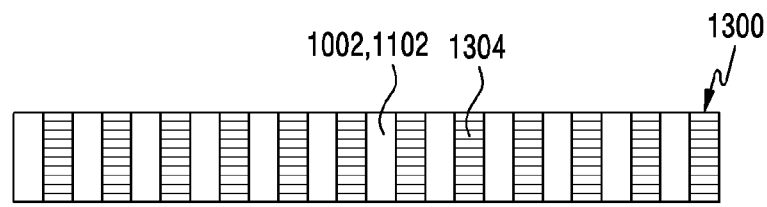

When it is determined that the decryption of the decompressed second data 1004 and 1104 fails in operation 917, the electronic device may reproduce the decompressed first data 1002 and 1102 and third data 1304 in operation 921. The processor of the electronic device may generate the third data 1304 as illustrated in FIG. 13A, and replace the decrypted second data 1204 with the third data 1304. That is, the size of the third data 1304 may be the same as the size of the decrypted second data 1204. For example, the size of the third data 1304 may be determined to be the size of the second region 1213, that is, the number of bits in the frames 1210. The processor may configure multimedia content 1300 by combining the decompressed first data 1002 and 1102 and the third data 1304 as illustrated in FIG. 13B. The decompressed first data 1002 and 1102 may include at least one piece of image data, audio data, or text data, and the third data 1304 may include blank or noise.

According to an embodiment, the electronic device may generate values of bits in the third data 1304 as 0. Accordingly, the electronic device may reproduce the third data 1304 as blank. For example, when the decompressed first data 1002 and 1102 are audio data, the electronic device may process the third data 1304 to be mute.

According to another embodiment, the electronic device may generate values of bits in the third data 1304 as a predetermined value. Accordingly, the electronic device may reproduce the third data 1304 as noise. For example, when the decompressed first data 1002 and 1105 are audio data, the electronic device may process the third data 1304 as noise.

According to an embodiment, the electronic device may perform operations 911 to 917 for some of the decompressed first data 1002 and 1102 and the decrypted second data 1204. Accordingly, the electronic device may reproduce some of the decompressed first data 1002 and 1102 and the decrypted second data 1204 in operation 919. Further, the electronic device may additionally reproduce the remaining data of the decompressed first data 1002 and 1102 and the decrypted second data 1204.

Figure 14:
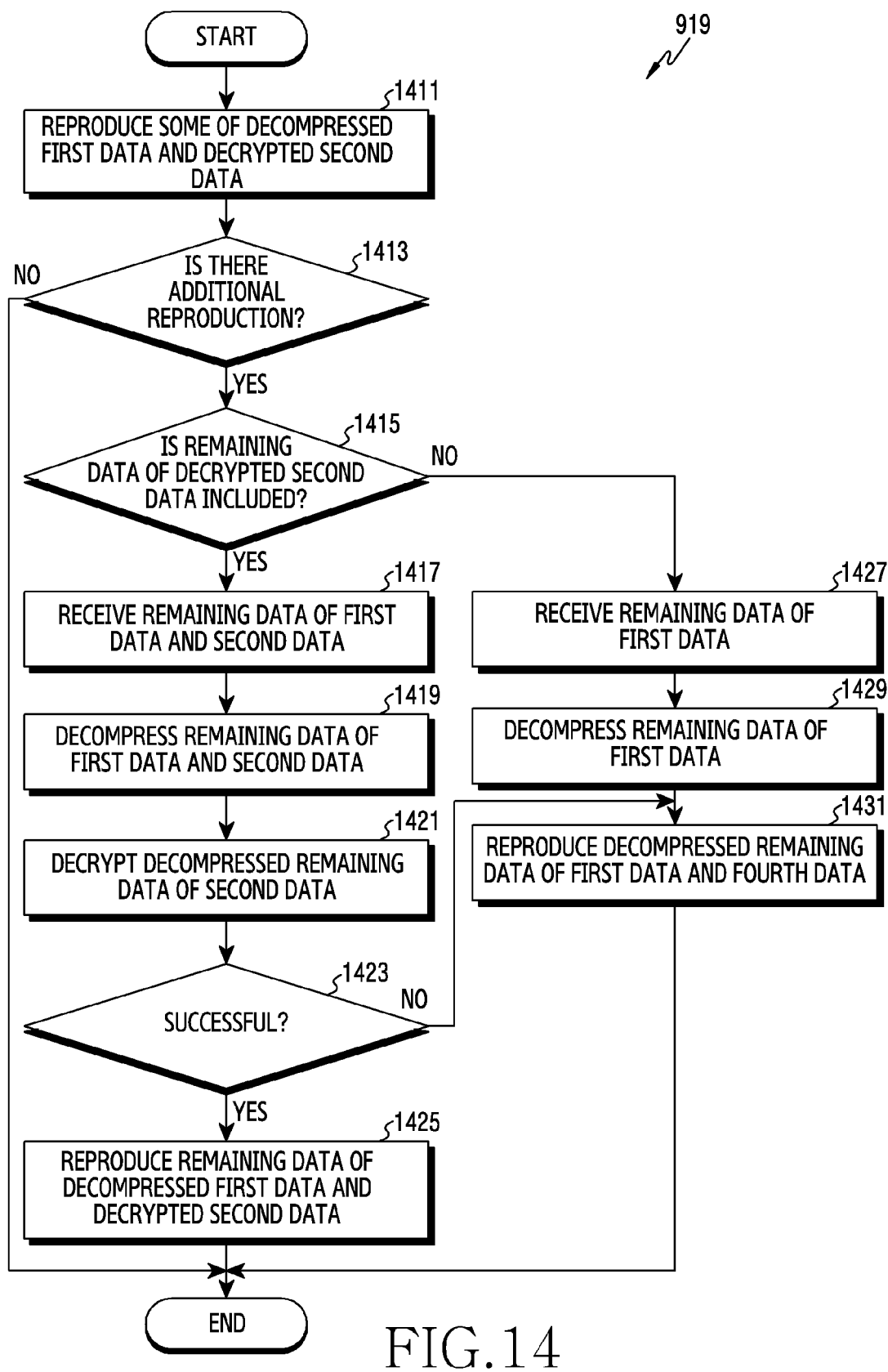
FIG. 14 illustrates a flowchart illustrating for the operation of reproducing decompressed first data and decrypted second data in FIG. 9 according to an embodiment of the disclosure.

FIG. 14 is a flowchart illustrating the operation 919 of reproducing the decompressed first data 1002 and 1102 and the decrypted second data 1204 in FIG. 9 according to an embodiment. FIG. 15 illustrates examples of the operation of reproducing the decompressed first data 1002 and 1102 and the decrypted second data 1204 in FIG. 9.

Referring to FIG. 14, the electronic device may reproduce some of the decompressed first data 1002 and 1102 and the decrypted second data 1204 in operation 1411. The electronic device may reproduce some of the decompressed first data 1002 and 1102 and the decrypted second data 1204 in a preview playback mode, for example, a preview or pre-listening mode. The processor may reproduce some of the decompressed first data 1002 and 1102 and the decrypted second data 1204 in accordance with at least one of the frames 1210. To this end, the processor may configure some of the multimedia content 1200 on the basis of some of the decompressed first data 1002 and 1102 and the decrypted second data 1204.

Figure 15A:
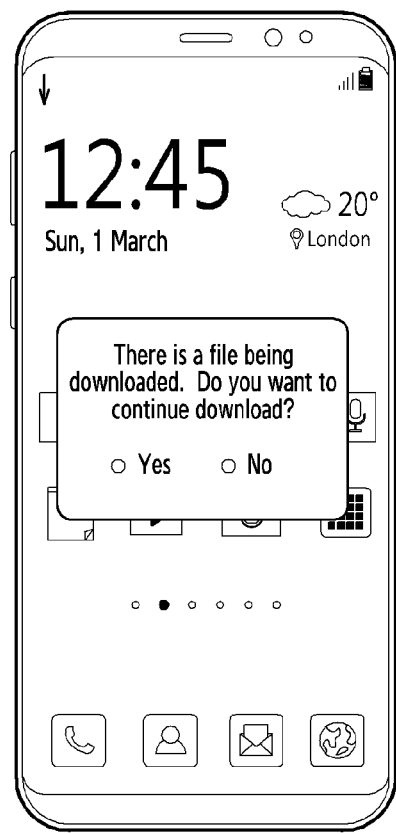
FIG. 15 illustrates examples of the operation of reproducing decompressed first data and decrypted second data in FIG. 9.

The electronic device may determine whether to additionally reproduce the remaining data of at least one piece of the decompressed first data 1002 and 1102 and the decrypted second data 1204 in operation 1413. According to an embodiment, the processor of the electronic device may display a graphic user interface, for example, a first graphic user interface to determine whether to additionally reproduce the remaining data of at least one piece of the decompressed first data 1002 and 1102 and the decrypted second data 1204 through the display device 160 as illustrated in FIG. 15A. For example, when some of the decompressed first data 1002 and 1102 and the decrypted second data 1204 is completely reproduced, the processor may display the first graphic user interface and wait for a user's decision during a predetermined timer interval. The processor may determine whether to additionally reproduce the remaining data of at least one piece of the decompressed first data 1002 and 1102 and the decrypted second data 1204 on the basis of the user's decision.

When it is determined not to additionally reproduce the remaining data of at least one piece of the decompressed first data 1002 and 1102 and the decrypted second data 1204 in operation 1413, the electronic device may return to FIG. 9. For example, when it is determined not to additionally reproduce the remaining data of at least one piece of the decompressed first data 1002 and 1102 and the decrypted second data 1204 through the first graphic user interface or when the predetermined timer interval passes without any user's decision after the first graphic user interface is displayed, the electronic device may determine that there is no need to additionally reproduce the remaining data of at least one piece of the decompressed first data 1002 and 1102 and the decrypted second data 1204.

Figure 15B:
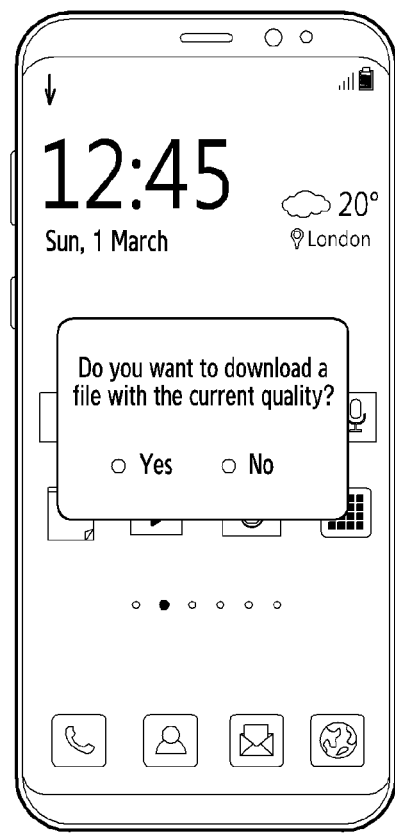

When it is determined to additionally reproduce the remaining data of at least one piece of the decompressed first data 1002 and 1102 and the decrypted second data 1204 in operation 1413, the electronic device may determine whether to reproduce the remaining data of the decrypted second data 1204 in operation 1415. According to an embodiment, the processor of the electronic device may display a graphic user interface, for example, a second graphic user interface to determine whether to reproduce the remaining data of the decrypted second data 1204 through the display device as illustrated in FIG. 15B. For example, when it is determined to additionally reproduce the remaining data of at least one piece of the decompressed first data 1002 and 1102 and the decrypted second data 1204 through the first graphic user interface, the processor may display the second graphic user interface and wait for a user's decision during a predetermined time interval. The processor may determine whether to reproduce the remaining data of the decrypted second data 1204 on the basis of the user's decision. For example, the user of the electronic device may determine whether to reproduce the remaining data of the decrypted second data 1204 on the basis of a desired reproduction quality. That is, when the user desires a relatively high reproduction quality, the user of the electronic device may determine to reproduce the remaining data of the decrypted second data 1204. When the user desires a relatively low reproduction quality, the user of the electronic device may determine not to reproduce the remaining data of the decrypted second data 1204.

When it is determined to reproduce the remaining data of the decrypted second data 1204 in operation 1415, the electronic device may receive the remaining data of the first data 1001 and the second data 1003 in operation 1417. The electronic device may decompress the remaining data of the first data 1001 and the second data 1003 in operation 1419. The electronic device may decrypt the remaining data of the decompressed second data 1004 and 1104 in operation 1421. Since operations 1417, 1419, and 1421 are similar to operations 911, 913, and 915 described above, a detailed description thereof will be omitted. The electronic device may determine whether decryption of the remaining data of the decompressed second data 1004 and 1104 is successful in operation 1423.

When it is determined the decryption of the remaining data of the decompressed second data 1004 and 1104 is successful in operation 1423, the electronic device may reproduce the remaining data of the decompressed first data 1002 and 1102 and the decrypted second data 1204 in operation 1425. The processor of the electronic device may reproduce the remaining data of the decompressed first data 1002 and 1102 and the decrypted second data 1204 in accordance with the remaining frames of the frames 1210. To this end, the processor may configure the remaining content of the multimedia content 1200 on the basis of the remaining data of the decompressed first data 1002 and 1102 and the decrypted second data 1204. Further, the electronic device may return to FIG. 9.

When it is determined that the decryption of the remaining data of the decompressed second data 1204 fails in operation 1423, the electronic device may reproduce the decompressed first data 1002 and 1102 and fourth data in operation 1431. For example, the fourth data may be determined as some of the third data 1304. The processor of the electronic device may reproduce some of the decompressed first data 1002 and 1102 and the third data 1304 in accordance with the remaining frames of the frames 1210. To this end, the processor may configure the remaining content of the multimedia content 1300 in accordance with some of the decompressed first data 1002 and 1102 and the third data 1304. Further, the electronic device may return to FIG. 9.

When it is determined that there is no need to reproduce the remaining data of the decrypted second data 1204 in operation 1415, the electronic device may receive the remaining data of the first data 1001 in operation 1427. The processor of the electronic device may receive the remaining data of the first data 1001 without receiving the remaining data of the second data 1003. The electronic device may decompress the remaining data of the first data 1001 in operation 1429. The electronic device may reproduce the decompressed first data 1002 and 1102 and fourth data in operation 1431. For example, the fourth data may be determined as some of the third data 1304. The processor of the electronic device may reproduce some of the decompressed first data 1002 and 1102 and the third data 1304 in accordance with the remaining frames of the frames 1210. To this end, the processor may configure the remaining content of the multimedia content 1300 in accordance with some of the decompressed first data 1002 and 1102 and the third data 1304. Further, the electronic device may return to FIG. 9.

Figure 16:
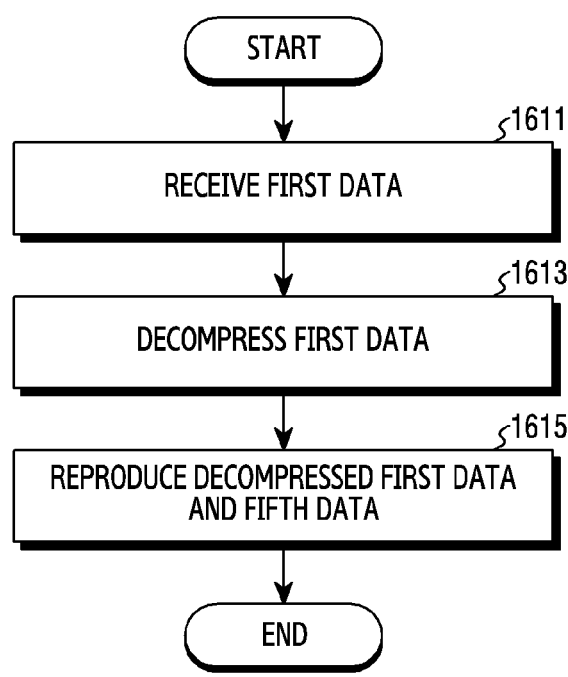
FIG. 16 illustrates a flowchart for a method of operating an electronic device according to an embodiment of the disclosure.

FIG. 16 is a flowchart illustrating a method of operating an electronic device (for example, the electronic device 101) according to an embodiment. FIG. 17 illustrates examples of a method of operating an electronic device according to an embodiment.

Figure 17A:
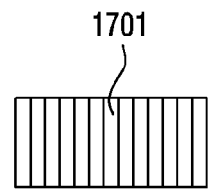
FIG. 17 illustrates examples of a method of operating an electronic device according to an embodiment of the disclosure.

Referring to FIG. 16, the electronic device may receive first data 1701 in operation 1611. A processor (for example, the processor 120) of the electronic device may receive the first data 1701 through a communication module (for example, the communication module 190). The first data 1701 may be compressed as illustrated in FIG. 17A. The first data 1701 may be compressed in a predetermined compression scheme. The first data 1701 may be compressed in, for example, a FLAC format. For example, the processor may store the first data 1701 in a memory (for example, the memory 130).

Figure 17B:
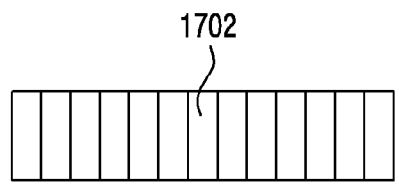

The electronic device may decompress the first data 1701 in operation 1613. For example, the processor may detect the first data 1701 in the memory and decompress the first data 1701. In another example, when the first data 1701 is received in operation 1611, the processor may decompress the first data 1701. The processor of the electronic device may decompress the first data 1701 to acquire decompressed first data 1702 as illustrated in FIG. 17B. The decompressed first data 1702 may be converted to, for example, a PCM format.

Figure 17C:
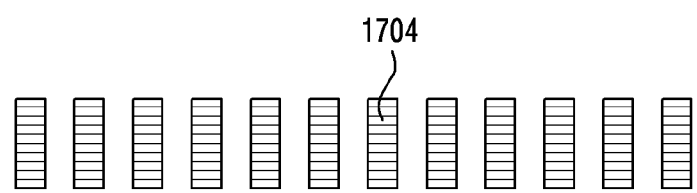
Figure 17D:
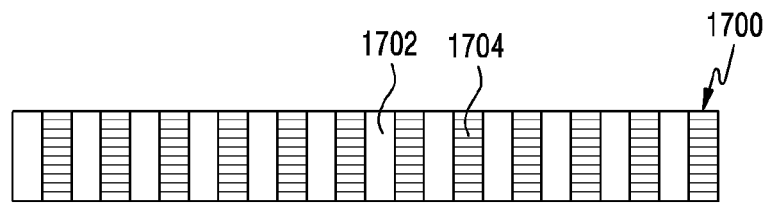

The electronic device may reproduce the decompressed first data 1702 and fifth data 1704 in operation 1615. According to an embodiment, the processor of the electronic device may generate the fifth data 1704 as illustrated in FIG. 17C. The processor may configure multimedia content 1700 by combining the decompressed first data 1702 and the fifth data 1704 as illustrated in FIG. 17D. The decompressed first data 1702 may include at least one piece of image data, audio data, or text data, and the fifth data 1704 may include blank or noise.

A method of operating an electronic device (for example, the electronic device 101) according to various embodiments may include an operation of receiving first data and second data, compressed in a predetermined compression scheme, an operation of decompressing the received first data and the received second data partially on the basis of the predetermined compression scheme, an operation of decrypting the decompressed second data, an operation of detecting success of the decryption, and an operation of reproducing the decompressed first data and the decrypted second data.

According to various embodiments, the method of operating the electronic device may further include an operation of detecting failure of decryption, an operation of replacing the decompressed second data with third data, and an operation of reproducing the decompressed first data and the third data.

According to various embodiments, a number of bits in the third data may be the same as a number of bits in the decrypted second data, and values of the bits in the third data may be 0.

According to various embodiments, the first data and the second data may be transmitted according to a plurality of frames including a first region for the first data and a second region for the second data.

According to various embodiments, the operation of receiving the first data and the second data may include an operation of receiving some of the first data and some of the second data in at least one of the frames.

According to various embodiments, the method of operating the electronic device may further include an operation of displaying a graphic user interface to determine whether to receive the remaining data of the first data and the second data, an operation of receiving the remaining data of the first data in the remaining frames of the frames on the basis of a user's decision, an operation of decompressing the received remaining data of the first data, and an operation of reproducing the decompressed remaining data of the first data and the third data.

According to various embodiments, the method of operating the electronic device may further include an operation of making a request for the first data and the second data on the basis of information indicating that the second data can be decrypted.

A non-transitory computer-readable storage medium according to various embodiments may store one or more programs for performing the operations of: receiving first data and second data, compressed in a predetermined compression scheme, decompressing the received first data and the received second data partially on the basis of the predetermined compression scheme, decrypting the decompressed second data, detecting success of the decryption, and reproducing the decompressed first data and the decrypted second data.

According to various embodiments, the programs may further perform the operations of detecting failure of decryption, replacing the decompressed second data with third data, and reproducing the decompressed first data and the third data.

According to various embodiments, a number of bits in the third data may be the same as a number of bits in the decrypted second data, and values of the bits in the third data may be 0.

An electronic device according to various embodiments can decrypt data having a predetermined size in multimedia content, and thus reduce overhead during the operation of the electronic device. Accordingly, when decryption is successful, the electronic device can reproduce high-quality multimedia content. Meanwhile, even though the decryption fails, the electronic device can reproduce the remaining data in the multimedia content. That is, the electronic device can reproduce the multimedia content even with a low quality. Accordingly, it is possible to reproduce multimedia content with various qualities.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a communication circuit;
an audio circuit;
at least one processor operatively connected to the communication circuit and the audio circuit; and
a memory operatively connected to the processor,
wherein the memory stores instructions, which when executed, cause the processor to:
make a request for content to an external electronic device through the communication circuit,
receive first data and second data for reproducing the content from the external electronic device, the first data being generated by compressing at least one first part of the content and the second data being generated by encrypting and compressing at least one second part of the content distinguished from the first part,
decompress the first data and the second data,
decrypt the decompressed second data,
determine whether the decompressed second data is decrypted successfully,
reproduce a first content formed by combining the decompressed first data and the decrypted second data, in response to determining that the decompressed second data is decrypted successfully, and
reproduce a second content formed by combining the decompressed first data and third data distinguished from the second data, in response to determining that the decompressed second data is decrypted unsuccessfully.

2. The electronic device of claim 1, wherein, when executed, the instructions cause the processor to:
identify the at least one first part corresponding to the first data in the content by decompressing the first data in response to non-identification of the at least one second part,
identify another part, distinguished from the first part, in the content, based on the third data based on at least one of a predetermined bit and a predetermined noise signal, and
reproduce the content, including the identified at least one first part and the identified another part.

3. The electronic device of claim 2, wherein a number of bits included in the identified another part is equal to a number of bits included in the identified second part, and the predetermined bit corresponds to 0.

4. The electronic device of claim 1, wherein, when executed, the instructions cause the processor to:
identify the first data in a predetermined first region of each of a plurality of frames in response to reception of the plurality of frames from the external electronic device, and
identify the second data in a second region next to the predetermined first region in each of the plurality of frames.

5. The electronic device of claim 4, wherein, when executed, the instructions cause the processor to:
receive remaining data of the first data in remaining frames of the frames,
decompress the received remaining data of the first data, and
reproduce the decompressed remaining data of the first data and fourth data through the audio circuit.

6. The electronic device of claim 4, wherein, when executed, the instructions cause the processor to:
decompress a part of the first data and a part of the second data,
decrypt the decompressed part of the second data, and
reproduce the decompressed part of the first data and decrypted part of the second data through the audio circuit.

7. The electronic device of claim 4, further comprising a display device operatively connected to the processor, wherein the instructions, when executed, cause the processor to display a graphic user interface to determine whether to receive the remaining data of the first data and the remaining data of the second data.

8. The electronic device of claim 1, wherein, when executed, the instructions cause the processor to:
decompress the first data received through the communication circuit, and reproduce the decompressed first data and fourth data through the audio circuit.

9. The electronic device of claim 1, wherein, when executed, the instructions cause the processor to make a request for the first data and the second data to the external electronic device through the communication circuit, based on information indicating that the second data can be decrypted.

10. The electronic device of claim 1, wherein, when executed, the instructions cause the processor to identify the at least one second part corresponding to the second data by decompressing the decrypted second data in response to success of decryption of the second data.

11. A method of operating an electronic device, the method comprising:
   receiving first data and second data for reproducing content, the first data being generated by compressing at least one first part of the content and the second data being generated by encrypting and compressing at least one second part of the content distinguished from the first part;
   decompressing the first data and the second data;
   decrypting the decompressed second data;
   determining whether the decompressed second data is decrypted successfully;
   reproducing a first content formed by combining the decompressed first data and the decrypted second data in response to determining that the decompressed second data is decrypted successfully; and
   reproducing a second content formed by combining the decompressed first data and third data distinguished from the second data, in response to determining that the decompressed second data is decrypted unsuccessfully.

12. The method of claim 11, wherein reproducing the second content, based on the third data and the first data comprises:
   identifying the at least one first part corresponding to the first data in the content by decompressing the first data in response to non-identification of the at least one second part;
   identifying another part, distinguished from the first part, in the content, based on the third data based on at least one of a predetermined bit and a predetermined noise signal; and
   reproducing the content including the identified first part and the identified another part.

13. The method of claim 11, wherein the receiving of the first data and the second data comprises:
   identifying the first data in a predetermined first region of each of a plurality of frames in response to reception of the plurality of frames from external electronic device; and
   identifying the second data in a second region next to the predetermined first region in each of the plurality of frames in response to identification of the first data.

14. The method of claim 13, further comprising:
   displaying a graphic user interface to determine whether to receive the remaining data of the first data and the remaining data of the second data;
   receiving the remaining data of the first data in the remaining frames of the frames, based on a user's decision;
   decompressing the received remaining data of the first data; and
   reproducing the decompressed remaining data of the first data and the third data.

15. The method of claim 11, further comprising: making a request for the first data and the second data, based on information indicating that the second data can be decrypted.

* * * * *